United States Patent [19]

Sasaki et al.

[11] Patent Number: 4,760,972
[45] Date of Patent: Aug. 2, 1988

[54] RECORDING TAPE CARTRIDGE AND HUB FOR USE THEREIN AND METHOD OF MAKING THE HUB

[75] Inventors: Shigeo Sasaki, Kyoto; Osamu Yamamoto, Takatsuki, both of Japan

[73] Assignee: Hitachi Maxell, Ltd., Osaka, Japan

[21] Appl. No.: 105,444

[22] Filed: Oct. 5, 1987

Related U.S. Application Data

[63] Continuation of Ser. No. 910,263, Sep. 19, 1986, abandoned, which is a continuation of Ser. No. 527,957, Aug. 31, 1983, abandoned.

[30] Foreign Application Priority Data

Sep. 1, 1982 [JP] Japan ................... 57-133265

[51] Int. Cl.[4] .................... B65H 75/18; B65H 16/10; B65H 18/10; G03B 1/04
[52] U.S. Cl. .................... 242/68.5; 242/71.8; 242/199
[58] Field of Search ............... 360/132, 137; 242/68.5, 242/68.4, 71.8, 197–200

[56] References Cited

U.S. PATENT DOCUMENTS

| | | | |
|---|---|---|---|
| 4,162,047 | 7/1979 | Hashimoto | 242/68.5 |
| 4,226,381 | 9/1980 | Katata | 242/71.8 |
| 4,254,917 | 5/1981 | Okamura et al. | 242/68.5 |
| 4,340,188 | 7/1982 | Derendorf et al. | 242/68.5 |
| 4,484,248 | 12/1984 | Ogiro et al. | 360/132 |

Primary Examiner—Robert S. Tupper
Assistant Examiner—Melissa J. Koval
Attorney, Agent, or Firm—Birch, Stewart, Kolasch & Birch

[57] ABSTRACT

A hub assembly for use in a recording tape cartridge is composed of an inner body and an outer ring formed around the inner body so as to decrease distortion on the out-of roundness and the verticality of the outer cylindrical surface of the hub assembly.

10 Claims, 12 Drawing Sheets

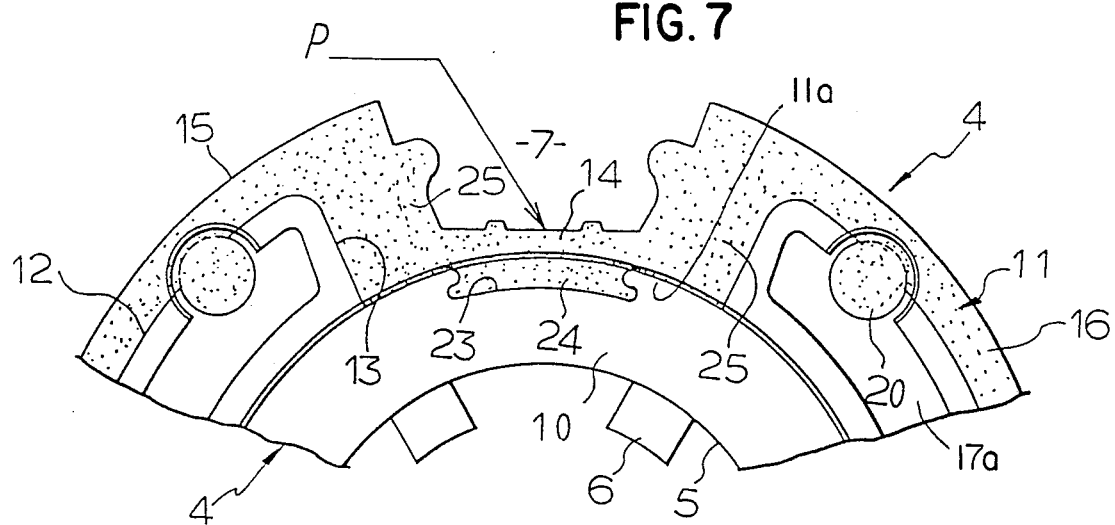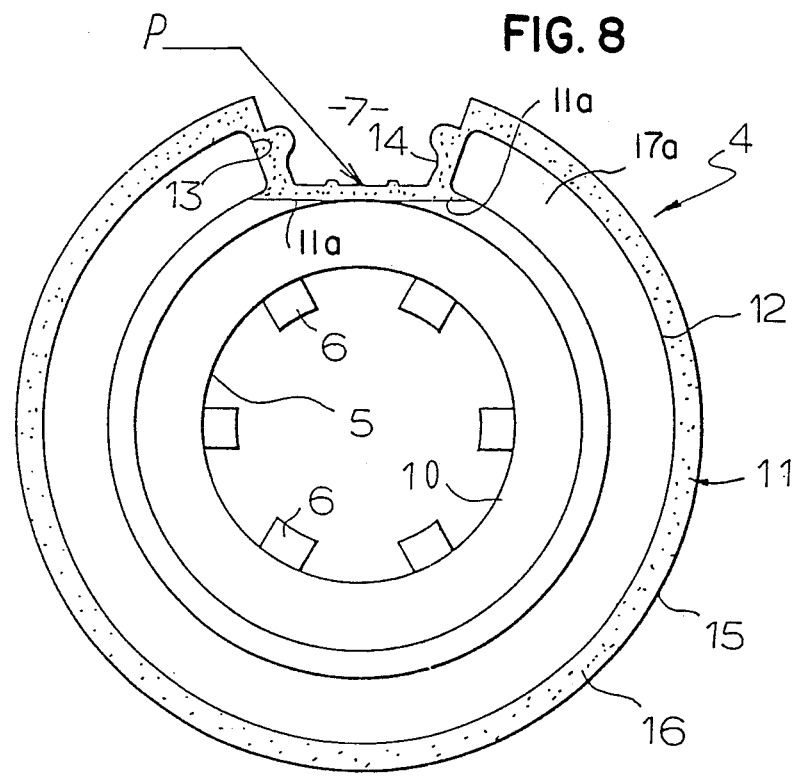

RECORDING TAPE CARTRIDGE AND HUB FOR USE THEREIN AND METHOD OF MAKING THE HUB

This application is a continuation, of application Ser. No. 910,263 filed on Sept. 19, 1986, now abandoned, which is a continuation of application Ser. No. 527,957 filed Aug. 3, 1983, now abandoned.

FIELD OF THE INVENTION

The present invention relates to a recording tape cartridge, and, more particularly, to an improvement of hubs for winding a recording tape accommodated in the recording tape cartridge.

BACKGROUND OF THE INVENTION

In a magnetic recording tape cartridge having a magnetic recording tape and a pair of hubs for winding the recording tape therearound, each of the hubs must be made with high accuracy with respect to the out-of roundness and flatness of the cylindrical surface of the hub for assuring correct running of the recording tape without deviation of the recording tape in a vertical direction. However, despite the fact that the hubs are solid, conventionally each of the hubs is molded as one integrated body by one molding process, therefore the hub tends to be deformed with sink marks formed on the cylindrical surface due to thermal deformation during the molding process, thereby lowering the accuracy of the out-of roundness and flatness or vertically of the cylindrical surface of the hubs. In a case where a magnetic recording tape is wound on the deformed hubs, the magnetic recording tape is also badly deformed by the deformed cylindrical surface, thereby resulting in unsteady tape running which causes deviation of the recording track and undesired recording and reproducing characteristics.

It has been quite difficult to avoid the occurrence of distortion on the cylindrical surfaces of the hubs so far as each of the hubs is formed by one molding process.

SUMMARY OF THE INVENTION

An essential object of the present invention is to provide a recording tape cartridge having hub means for Another object of the present inventio is to provide a recording tape cartridge which assures correct running of the recording tape without deviation of the recording track.

A further object of the present invention is to provide a hub means for use in a recording tape cartridge which can be easily manufactured with high accuracy with respect to the out-of roundesss and flatness of the cylindrical surface of the hub means.

BRIEF DESCRIPTION OF THE DRAWINGS

FIG. 7 is a partial enlarged plan view showing an essential portion of the hub assembly shown in FIG. 2, FIG. 8 is a plan view of a further embodiment of a hub assembly according to the present invention.

DETAILED DESCRIPTION OF THE PREFERRED EMBODIMENTS

Figure 1:
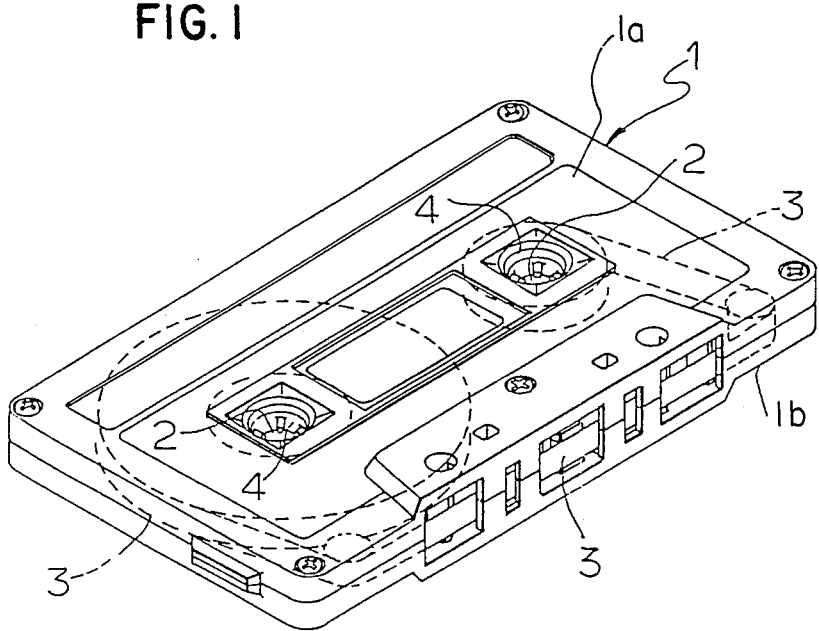
FIG. 1 is a perspective view of a magnetic recording tape cartridge according to the present invention.

Referring to FIG. 1, there is seen a magnetic recording tape cartridge 1 having a pair of drive shaft insertion holes 2 defined through a top wall 1a and a bottom wall 1b in a known manner. A pair of hubs 4 are rotatably mounted in the cartridge 1 with the central holes 5 (See FIG. 2) aligned with the drive shaft insertion holes 2. A magnetic recording tape 3 is wound around the cylindrical surface of the hubs 4 in rolls with both end portions of the recording tape engaged with engaging members (not shown) of the respective hubs 4 and the magnetic recording tape can be released from one hub and taken up by another hub, running along the front surface of the cartridge 1.

Figure 2:
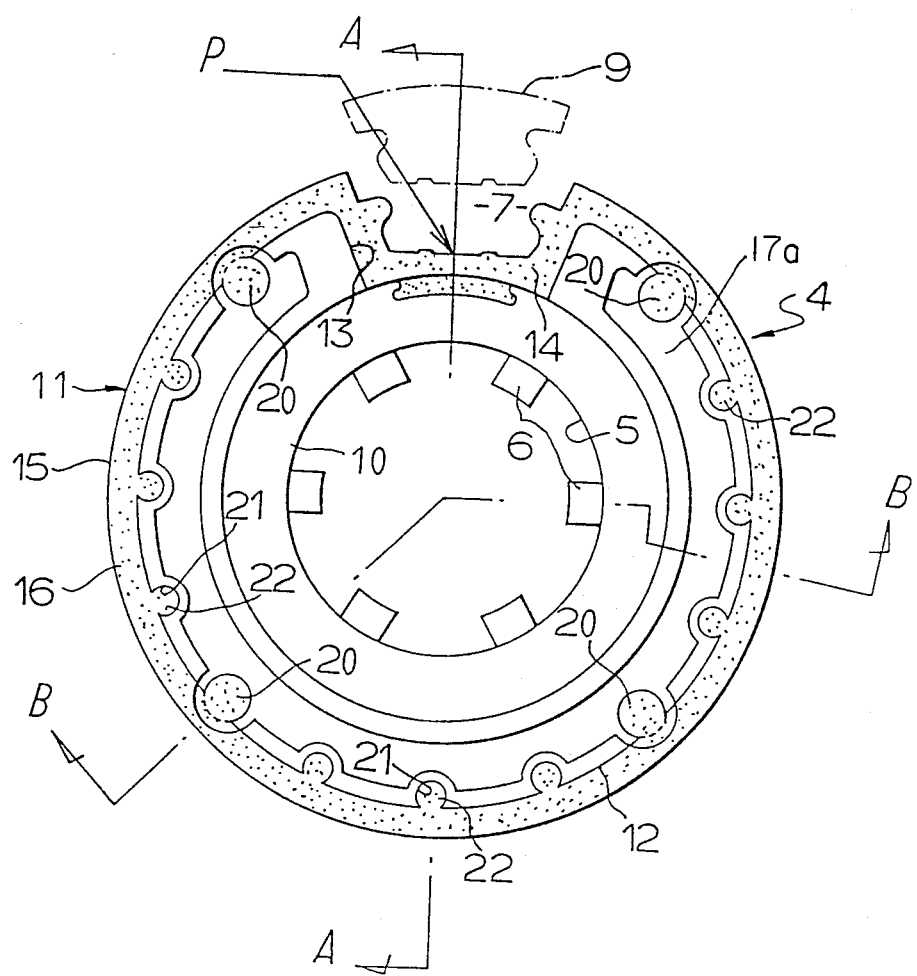
FIG. 2 is a top plan view showing an embodiment of a hub assembly used in the magnetic recording tape cartridge shown in FIG. 1.
Figure 3:
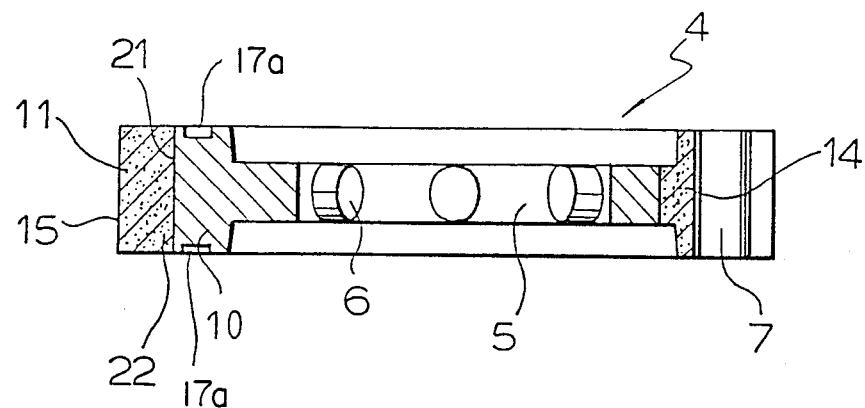
FIG. 3 is a cross sectional view along the line A—A in FIG. 2.
Figure 4:
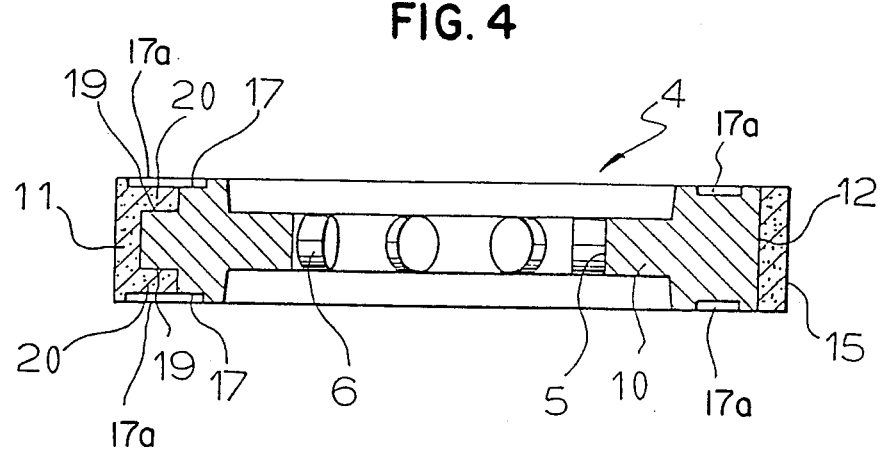
FIG. 4 is a cross sectional view along the line B—B in FIG. 2.

As shown in FIGS. 2 and 3, each of the hubs 4 has six projecting members 6 projected radially inward from the inner surface defining the central hole 5. A recess 7 is defined on the cylindrical surface of the hub 4 for receiving a clamping member 9 made of an elastic member so that one end of the recording tape 3 can be clamped by the clamping member 9 fitted in the recess 7.

Referring to FIGS. 2 through 6, each of the hub assembly 4 comprises an inner body 10 having a rather large thickness in an axial direction of the hub for forming the essential portion of the hub 4 and an outer ring 11 which is thin in a radial direction and fixedly fitted with the outer cylindrical surface of the inner body 10 so as to provide an outer cylindrical part of the hub assembly 4.

The inner body 10 comprises the central hole 5 at its central part and the projecting members 6. A recess 13 is defined on the outer cylindrical face of the inner body 10. The outer ring 11 comprises a wall member 14 for defining the recess 7 and being engaged in the recess 13 of the inner body 10 and a ring member 16 to provide the outer cylindrical surface of the hub assembly 4 with both ends 16a connected with both ends of the wall member 14. The outer cylindrical surface 15 of the ring member 16 has an accurate out-of roundness or circularity and an accurate verticality in the axial direction.

In FIG. 2, the dotted portion shows the outer ring 11. More specifically, the inner body 10 and the outer ring 11 are formed of plastic resin materials with different colors by the bi-color resin molding method. Preferably, the inner body 10 is primarily molded by an upper die and a lower die, subsequently the inner body 10 with the lower die is separated from the upper die, then the lower die with the inner body 10 is transferred directly below a second upper die for making the outer ring 11. After the lower die and the second upper die are assembled together, the outer ring 11 is molded around the inner body 10 which is used as a core, then the inner body and the outer ring 11 are adhered by fusing their boundary surfaces. The inner body 10 and the outer ring 11 are molded of a similar plastic resin material such as polyacetal resin with different colors. In plastic molding, there tend to be formed sink marks and a trace of a gate near the injection gate, therefore, especially for molding the outer ring 11, the injection gate P is defined in the bottom portion of the clamping recess 7.

In a case where the ring portion 16 of the outer ring 11 is too thick, sink marks occur in the outer cylindrical surface of the outer ring 11 and, to the contrary, if it is too thin, the outer ring 11 is apt to be deformed due to the effect of the sink mark of the inner body. To avoid such deficiencey, the thickness of the ring portion 16 of the outer ring 11 may be 0.1 mm through 5 mm, preferably 0.5 mm through 2.5 mm and specifically 1.5 mm.

The hub assembly 4 shown in the embodiment is provided with an arrangement for preventing displacement between the inner body 10 and the outer ring 11 in an axial direction and separation therebetween in a radial direction.

As shown in FIGS. 2 and 3, on the top and the bottom end surfaces 17 of the inner body 10 four stepped recesses 19 are formed extending inwardly from the outer cylindrical surface 12 at the quadrisection points in a circumferential direction. Generally annular recesses 17a are defined on both end surfaces of the inner body 10 so as to decrease friction between the end surfaces of the hub assembly 4 and slip sheets (not shown) laid on the inner surface of the cartridge, thereby fascilitating smooth running of the hub assembly 4. On the other hand, on the ring portion 16 of the outer ring 11, four engaging members 20 in the form of semi-circular plates are projectingly formed in the inward direction from the inner cylindrical surface of the ring portion 16 at the positions corresponding to the stepped recesses 19, so that the engaging members 20 can be fitted in the stepped recesses 19 in a face to face contacting manner when the inner body 10 is combined with the outer ring 11 to prevent displacement between the outer ring and the inner body in a vertical direction. A plurality of short cylindrical slots 21 are formed in the outer circumferential edge portions of the inner body 10 in the vertical direction with a suitable interval. On the other hand, a plurality of projections 22 are formed on the inner peripheral edge portions of the outer ring 11 so that the projections 22 are strictly fitted in the corresponding slots 21, thereby preventing separation of the outer ring 11 from the inner body 10 during and after the molding process to avoid occurrence of the distortion and errors in the out-of roundness of the cylindrical surface of the outer ring 11. As the projections 22 are constricted on the connecting portions to the inner cylindrical face of the outer ring 11, occurrence of sink mark on the outer cylindrical edge of the outer ring 11 corresponding to the projections 22 can be effectively avoided.

A dovetail groove 23 is defined in the bottom edge portion of the recess 13 through the inner body 10 in the axial direction of the inner body 10. Corresponding to the dovetail groove 23, an engaging member 24 is formed on the wall member 14 which defines a bottom part of the recess 7 so that the engaging member 24 is strictly fitted in the dovetail groove 23 when the inner body 10 and the outer ring 11 are molded. By this arrangement, the wall member 14 is not separated from the inner ring 11 in the radial direction.

According to the hub assembly described above, after the inner ring 10 is primarily molded, the thin outer ring 11 is subsequently molded around the inner body 10, so that the outer ring 11 can be manufactured with a high accuracy of out-of roundness and verticality of the annular surface thereof. Therefore, even if there occurs sink marks on the peripheral surface of the inner body 10, the effect of the sink marks does not appear on the outer cylindrical surface of the hub assembly so that accuracy of the out-of roundness and the verticality of the hub assembly can be assured. Furthermore, since the inner body 10 and the outer ring 11 have different colors, it is advantageous in a reversible recording tape cartridge as shown in the embodiment, to make it easy to recognize a relative position between the rewinding hub and the taken up hub. In addition, rotational direction of the hub assembly can easily be recognized by the different colors between the inner body 10 and the outer ring 11. These different colors between the inner body and outer ring also enhance the effect of the design of the external appearence of the hub assembly.

Figure 6:
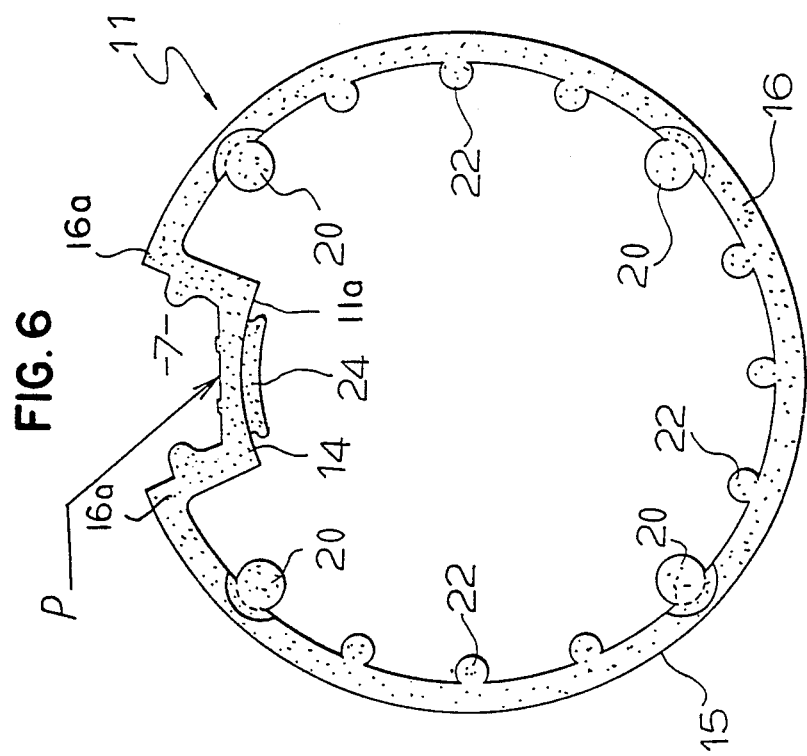
FIG. 6 is a plan view of an outer ring shown in FIG. 2.
Figure 5:
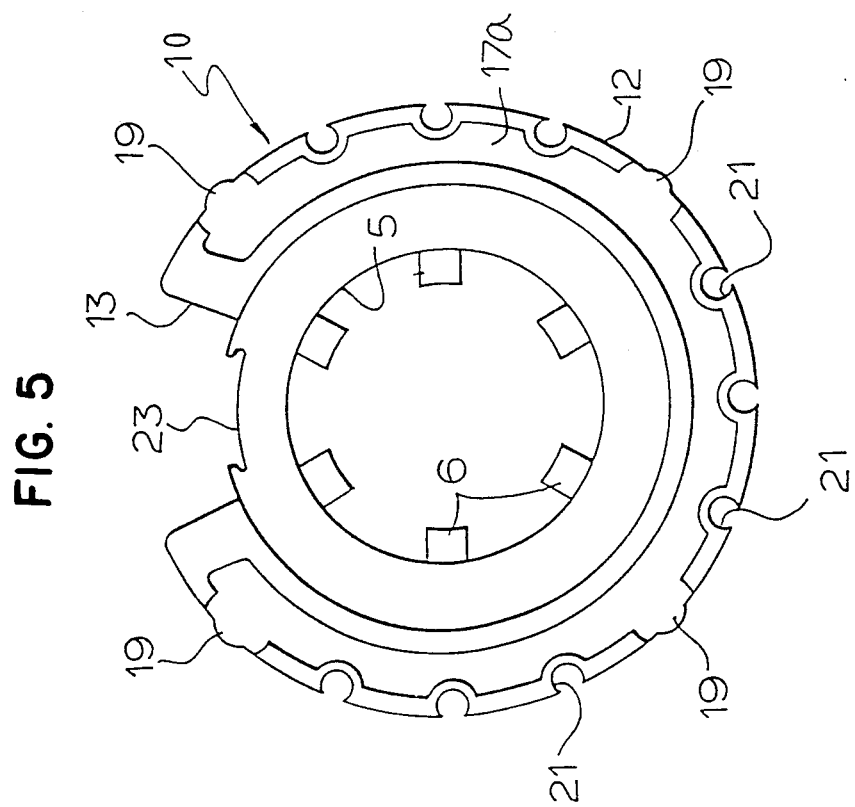
FIG. 5 is a plan view of an inner body shown in FIG. 2.

As shown in FIG. 6, a bottom wall surface 11a of the outer ring 11, which is opposite the recess 7, has an arcuate shape conforming to the arcuate face of the cylindrical surface of the inner body 10.

In another embodiment of the hub assembly shown in FIG. 7, both side walls 25 for defining the recess 7 have a large thickness in the circumferential direction so as to facilitate running of plastic resin material from the injection gate P situated at the bottom of the recess 7 towards the ring portion 16 during the molding process of the outer ring 11, thereby improving accuracy of shape of the hub assembly.

A further embodiment of the hub assembly according to the present invention is shown in FIG. 8, wherein the inner surface of the outer ring 11 and the outer surface of the inner body 10 are formed of simple cylindrical surfaces so that they are combined together in surface to surface contact relation. In this embodiment, separation of the inner body and the outer ring can be prevented. Also, displacement between the inner body and the cuter ring can be prevented. In this embodiment, opposite to the recess 7, the wall surface 11a of the outer ring 11 and the part of the outer surface of the inner body 10 are made flat, so as to be combined together.

Figure 9:
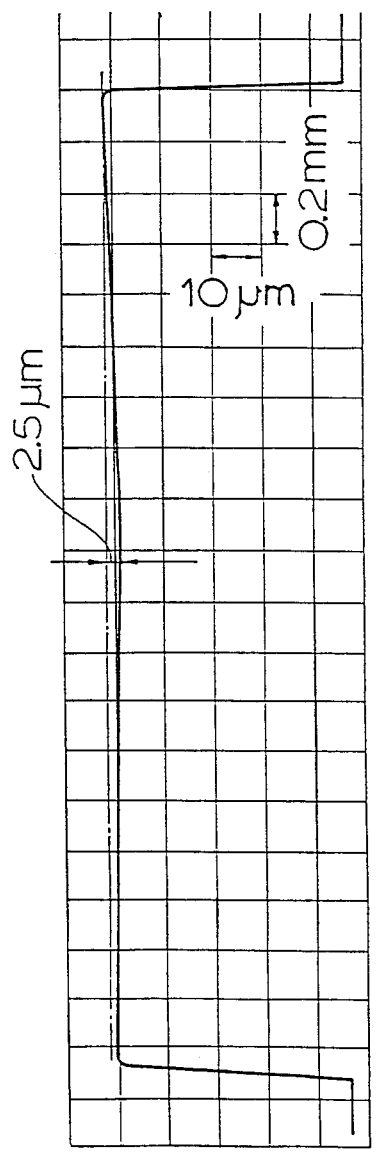
FIG. 9 is a graph showing an example of a distortion on an outer cylindrical surface of a hub assembly of a recording tape cartridge according to the present invention.

In order to recognize the verticality of the cylindrical surface of the hub assembly 4 according to the present invention, roughness of the hub assembly was measured by scanning a contact tip of a surface roughness tester along the cylindrical surface of the hub, swinging the contact tip by 3.98 mm in the axial direction of the hub. The result of the measurement is shown in FIG. 9 in which the scale of the vertical axis and horizontal axis is enlarged by 1000 times from the real measured value.

Figure 10:
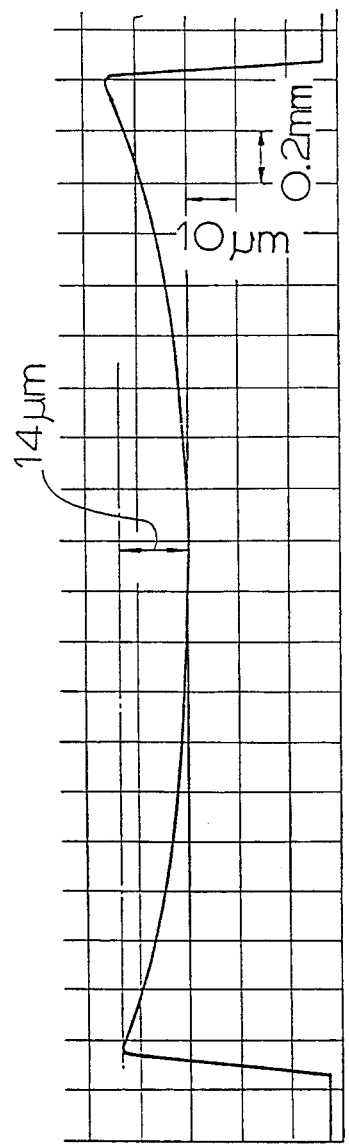
FIG. 10 is a graph showing an example of a distortion on an outer cylindrical surface of a hub of a conventional recording tape cartridge.

A measurement was made in the similar way as described above about a conventional hub molded by a single integrated body. The result of the measurement is shown in FIG. 10.

According to the results of both measurements, the maximum distortion in the radial direction of the cylindrical surface of the hub assembly according to the present invention was 2.5 $\mu$m, while the maximum distortion of the conventional hub was 14 $\mu$m. Thus, the hub assembly according to the present invention is improved in that distortion of the cylindrical surface of the hub assembly is decreased to 1/5.6 compared with the distortion occurred in the conventional hub.

A recording/reproducing characteristic of a magnetic recording tape cartridge using the hub assemblies according to the present invention was checked. The magnetic recording tape cartridge according to the present invention was mounted in a recording/reproducing apparatus, then a pair of exactly same sine wave signals of 6.3 KHz were simultaneously recorded on two tracks of the left and right channels on the magnetic recording tape respectively, checking that phase displacement does not occur between the two sine wave signals by a phase meter. The recording of the signals are made over the entire length of the recording tape. After the recorded tape was rewound, the recorded sine wave signals of the left and right channels were reproduced while the phase displacement between both reproduced signals were measured by the phase meter so as to check the fluctuation of the recording/reproducing characteristic caused by the distortion or error of the verticality of the cylindrical surface of the hub assembly. In the meantime, the output wave forms of the reproduced signals were checked by an oscilloscope or a pen recorder. The same measurement as described above was made on a magnetic recording tape cartridge using the conventional hub to check the phase difference between the reproduced signals of the left and right channels. As a result of the measurement, it becomes apparent that the phase difference of the signals of the right and left channels is relatively large at the beginning and the ending of the recording tape due to the distortion in the cylindrical surface of the hub. However, the maximum value of the phase difference was 40 in the conventional recording tape cartridge, while the phase difference was 20 in the recording tape cartridge according to the present invention. Thus, according to the present invention, the recording and reproducing characteristics can be effectively improved.

A way of molding of the hub assembly as described above will be explained in detail with reference to FIGS. 11 to 16.

Figure 11:
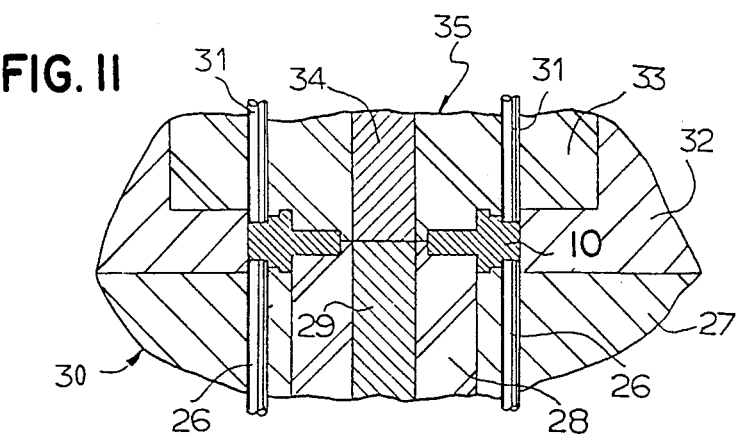
FIGS. 11 through 16 are cross sectional views showing an example of a way of molding a hub assembly according to the present invention.
Figure 12:
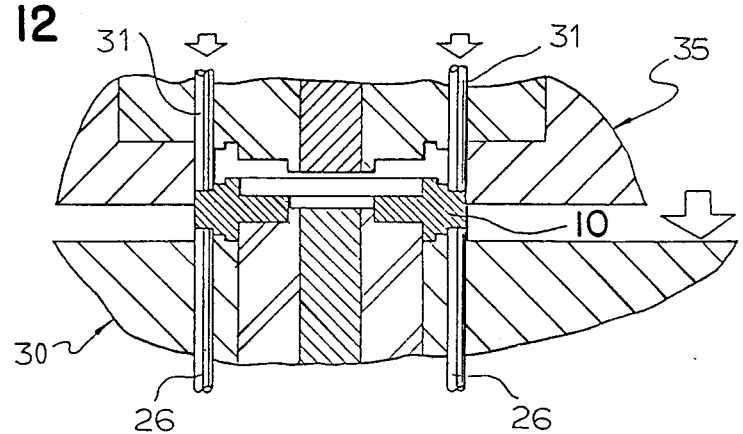
Figure 13:
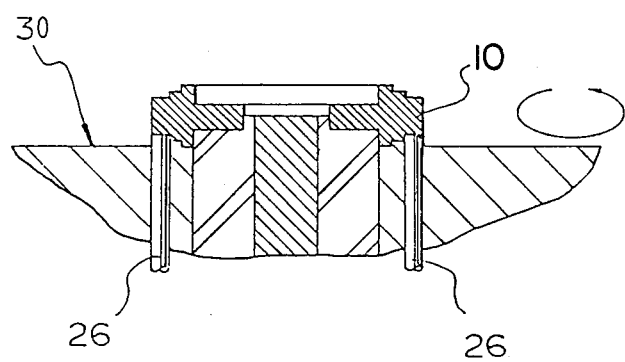
Figure 14:
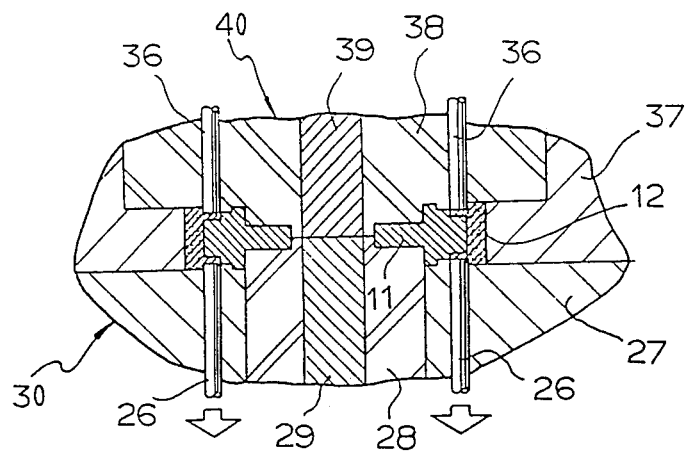
Figure 15:
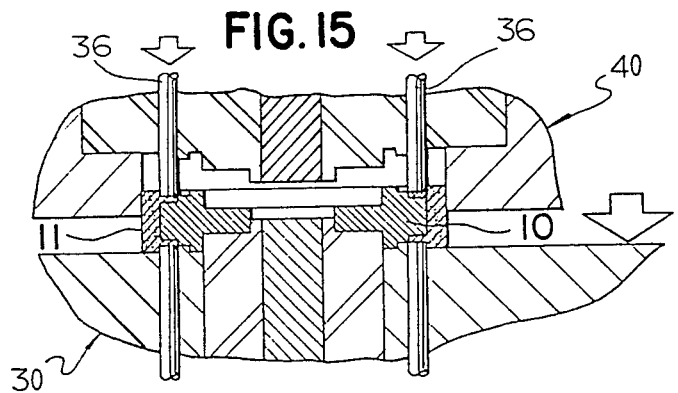
Figure 16:
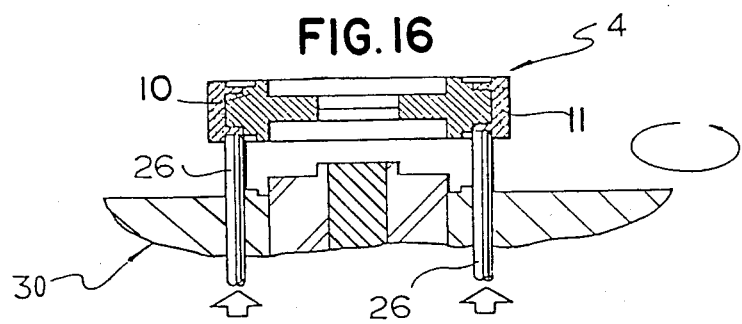

FIGS. 11 to 13 show the primary molding process of the inner body 10 and FIGS. 14 to 16 show the secondary molding process of the outer ring 11. As a die assembly there are provided a lower movable die 30 used for forming the lower surface of the inner body 10 and the lower surface of the outer ring 11, an upper die 35 for molding the inner body 10 and an upper die 40 for molding the outer ring 11. The lower movable die 30 comprises four pushing pins 26 and cores 27, 28 and 29 for forming the respective lower surfaces of the inner body 10 and the outer ring 11. The upper die 35 comprises four pushing pins 31 corresponding to the pushing pins 26 in the lower movable die 30 and cores 32, 33 and 34 for forming the cylindrical surface and the upper surface of the inner body 10 including the recess 7. The upper die 40 comprises four pushing pins 36 and cores 37, 38 and 39 for forming the outer cylindrical surface and the upper surface of the outer ring 11 including the recess 7. The movable die 30 is rotatable in a horizontal plane and is normally situated remote from the upper die 35 and the upper die 40 for the outer ring.

In FIG. 11, the movable die 30 is assembled with the upper die 35 for the inner body, subsequently white plastic resin material is injected into the cavity defined by the dies 30 and 35 to mold the inner body 10. During this process, the pushing pins 26 are moved upwardly and the pushing pins 31 are moved downwardly to form the respective stepped faces 19 on the top and bottom faces of the inner ring 10 at the respective quadrisected points on the outer cylindrical surface portion of the inner body 10 by the end surfaces of the pushing pins 26 and 31.

In FIG. 12, the dies 30 and 35 are separated after the inner body 10 is cooled and cured up to such a condition that the inner body can be taken out of the dies. In this process, the pushing pins 31 of the upper die 35 are projected downwardly so as to separate the inner body 10 with the movable die 30 from the upper die 35.

Subsequently, as shown in FIG. 13, after the movable die 30 is separated from the upper die 35, the spool runner is pushed out of the die, then the movable die 30 is moved from the upper die to a remote position with the inner body 10 contained in the movable die.

In FIG. 14, the movable die 30 containing the inner body 10 is moved just below the upper die 40 for the outer ring 11, then the movable die 30 is assembled with the upper die 40. Subsequently, the pushing pins 26 are downwardly retracted slightly. Prior to that step, also the lower ends of the pushing pins 36 were located slightly higher than the stepped face 19. Then, the plastic resin material of yellow color for the secondary molding is injected in the dies 30 and 40 to mold the outer ring 11. In this process, the engaging members 20 are formed in the gaps between both opposed ends of the pushing pins 26 and 36 so that the engaging members 20 are projected radially inwardly from the inside edge of the outer ring 11.

In FIG. 15, after the outer ring 11 is cured, the dies 30 and 40 are separated. In this process, the pushing pins 36 of the upper die 40 are moved downwardly to separate the hub assembly 4 with the movable die 30 from the upper die 40. Subsequently, the hub assembly 4 is separated from the movable die 30 with the spool runner for the secondary molding by projecting the pushing pins 26 provided in the movable die.

Thereafter, the movable die 30 is moved just below the upper die 35 for the inner body as shown in FIG. 11. By repeating the steps as described above, a plurality of hub assemblies having two colors can be continuously manufactured by bicolor molding. According to the molding process as described above, the hub assemblies having the completely same configuration on both of the top side and the bottom side can be manufactured.

Figure 18:
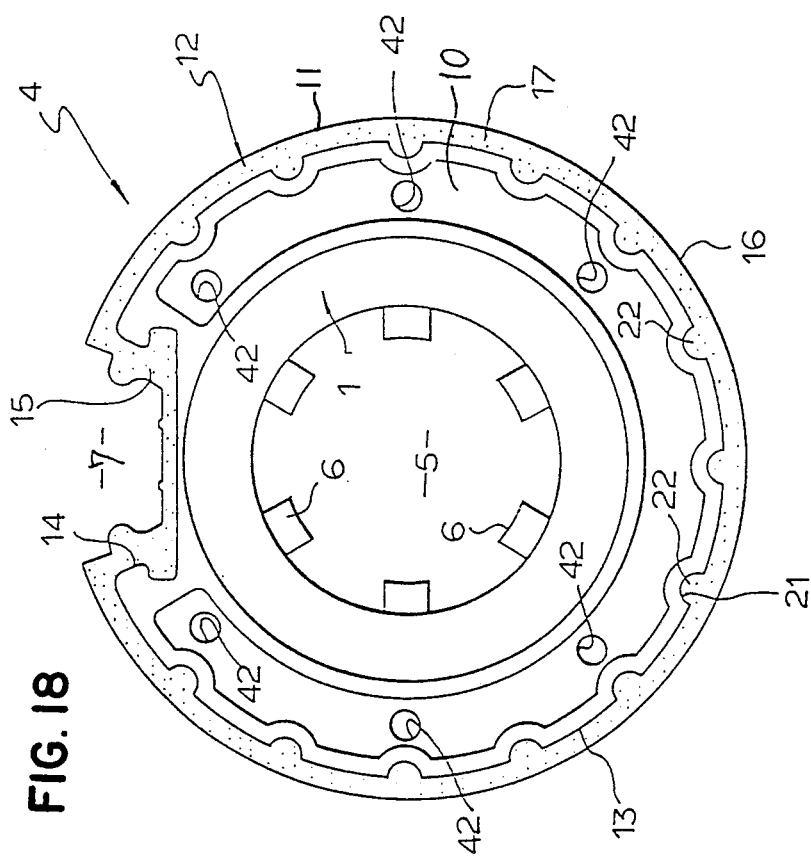
FIG. 18 is a top plan view of another embodiment of the hub assembly according to the present invention.
Figure 17:
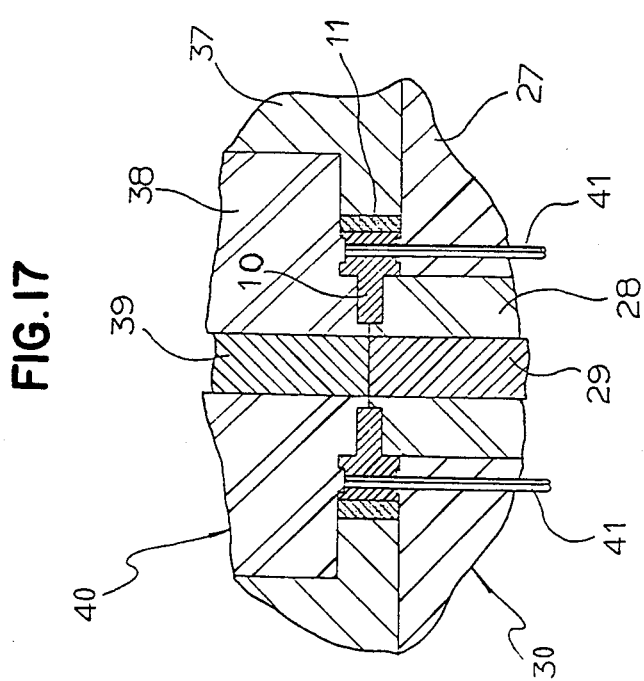
FIG. 17 is a cross sectional view showing an essential portion of a modification of a way of molding a hub assembly according to the present invention.

In place of the pushing pins 31 and 36, as shown in FIG. 17, a plurality of pins 41 penetrating through and projected from the movable die 30 can be used for separating the molded hub assembly from the respective upper dies 35 and 40 by using the engaging force between the inner body 10 and the pins 41. Preferably the pins 41 may be tapered in such a manner that the diameter of the pins 41 becomes large in a direction of the separation of the movable die 30. The pin 41 may be a straight cylindrical shape. The hub assembly molded by the way shown in FIG. 17, results in a plurality of holes 42 defined in the inner body 10, as shown in FIG. 18. As shown in FIG. 18, the stepped faces 19 may be engaging members 20 connecting to the stepped face 19 may be omitted. Furthermore in the present invention, the provision of the slots 21 and the projections 22 is not essential.

Figure 19:
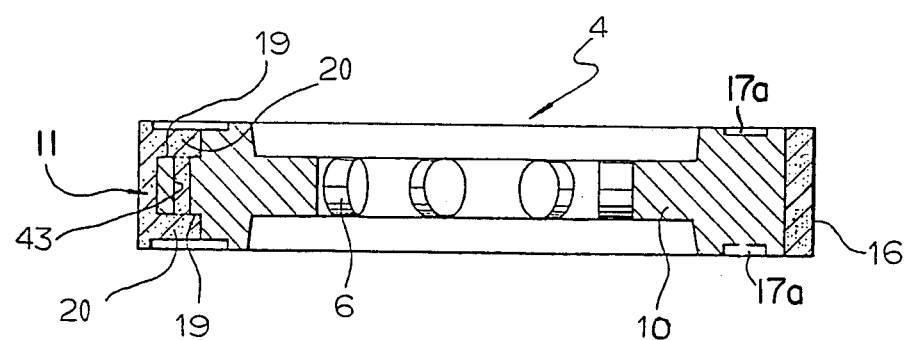
FIG. 19 is a cross sectional view showing a further embodiment of the hub assembly according to the present invention.
Figure 20:
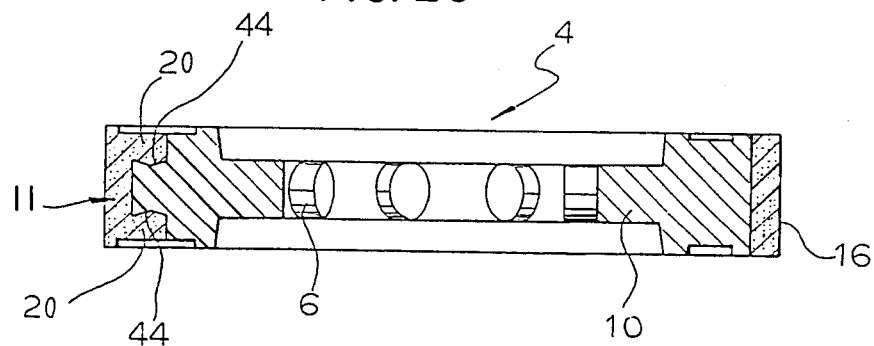
FIG. 20 is a cross sectional view showing a further embodiment of the hub assembly according to the present invention.

As shown in FIG. 19, in order to prevent the displacement in the vertical direction and the separation in the radial direction between the inner body 10 and the outer ring 11, through holes 43 are defined between the opposed stepped faces 19 so that the molding material can be injected in the through holes 43. Further, recesses 44 also may be defined between the opposed stepped faces 19 so that the engagement between the engaging members 20 and the stepped faces 19 can be reinforced.

In a case where different materials are used for the inner body and the outer ring, for example, poly acetal resin and acrylonitrile-butadiene-styrene copolymer resin can be used.

The movable die 30 may be moved in a linearly reciprocal manner.

Figure 21:
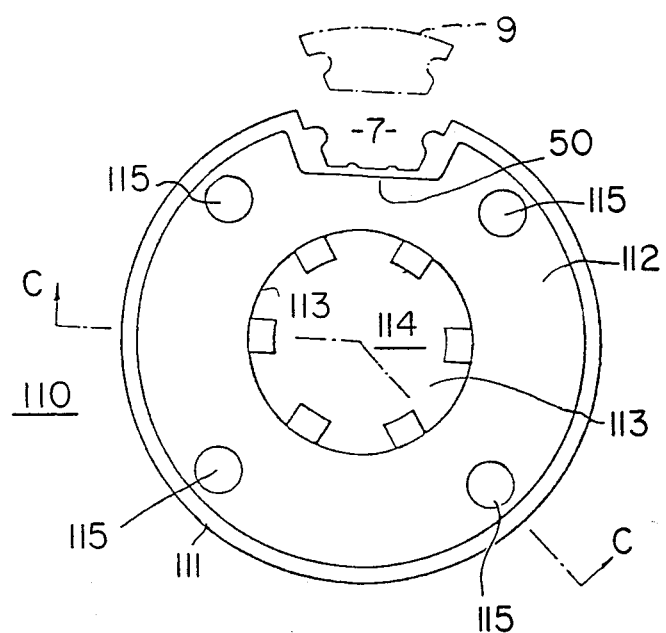
FIG. 21 is a top plan view showing an outer member of a further embodiment of the hub assembly according to the present invention.
Figure 22:
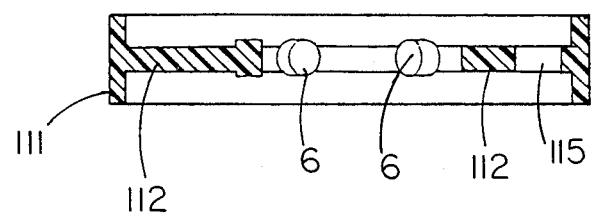
FIG. 22 is a cross ssectional view taken along the line C—C in FIG. 21.

A still further embodiment of the hub assembly according to the present invention is shown in FIGS. 21 through 24. In FIGS. 21 and 22, a first molded body 110 is formed by an outer thin cylindrical member 111 for winding the magnetic recording tape. An annular plate member 112 connected with the inner cylindrical surface of the cylindrical member 111 at the center in an axial direction and six projecting members 6 projected inwardly from the inner wall 113 defining a central hole 114. The recess 7 for receiving the clamping member 9 is defined in the outer peripheral part of the first molded body 110 in the same way as shown in the embodiments described above.

In order to prevent occurrence of sink marks on the outer cylindrical surface, the cylindrical member 111 is thin having a thickness generally equal to the thickness of the annular plate member 112. In the annular plate member 112, a plurality of holes 115 are defined at an equal interval.

Figure 23:
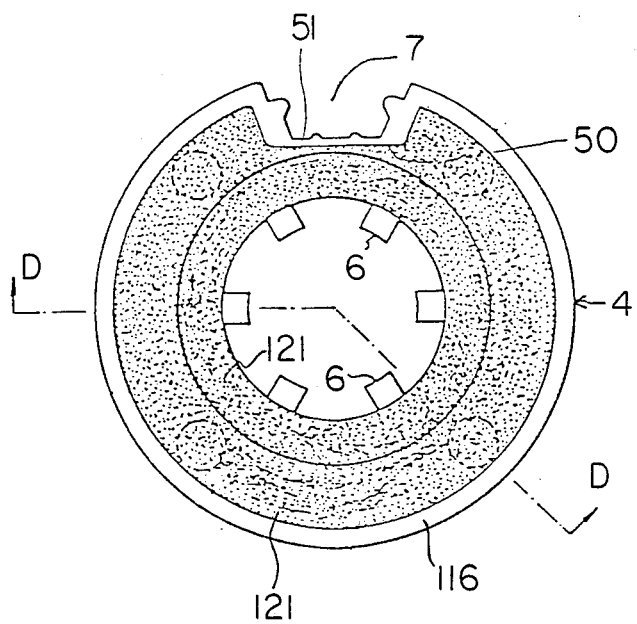
FIG. 23 is a top plan view showing a further embodiment of the hub assembly according to the present invention in which the outer member shown in FIG. 21 is assembled with an inner member.
Figure 24:
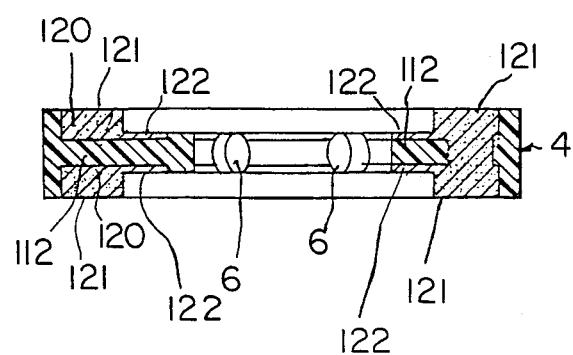
FIG. 24 is a cross sectional view of the hub assembly taken along the line D—D in FIG. 23.

Second molded members 120 are formed on both sides of the annular plate member 112 inside the cylindrical member 111 so as to enclose the annular plate member 112 by outer annular members 121 and inner annular members 122, as shown in FIGS. 23 and 24. The second molded members 120 on both sides of the first molded body 110 are integrally connected together by connecting parts 123 formed in the holes 115 so as to prevent separation of the first molded body 110 and the second molded members 120. The first molded body 110 and the second molded members 120 have different colors, in other words, the outer ring portion 116 and the projecting members 6 appear to be the same color and the second molded members 120, i.e., the inner body, appears to be the different color. Except for the recessed portion 7, the outer cylindrical surface of the second molded members 120 which corresponds to the inner body 10 is formed by a simple round surface and the outer ring portion 116 are formed by a simple annular ring.

The bottom portion of the recess 7 of the outer ring portion 116 is formed by a flat surface 50 and wall members 51 of the second molded members 120 engaging with the flat surface 50 are also formed by a flat surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording tape cartridge comprising a cartridge case and hub rotatably accoommodated in said cartridge case for winding a recording tape thereon, said hub comprising two separate and distinct integral elements including an inner body having a relatively large thickness in an axial direction and an outer ring thin in said axial direction fitted on an outer cylindrical surface of said inner body, said outer ring having a thickness less than the thickness of said inner body such that said thin outer ring is void of all sink marks and the entire circumferential inner surface of said thin outer ring contacts the entire outer cylindrical surface of said inner body, wherein the recording tape is wrapped around the entire outer cylindrical surface of said outer ring.

2. The recording tape cartridge according to claim 1, wherein said inner body of said hub is made of a plastic resin having a color different from a color of a plastic resin of said outer ring.

3. The recording tape cartridge according to claim 1, wherein said hub further comprises a recessed portion for engagement with a clamping member for clamping an end portion of said recording tape, and an injection gate formed on a bottom portion of said recessed portion.

4. The recording tape cartridge according to claim 1, wherein the thickness of said outer ring is in a range of from 0.1 mm to 5 mm.

5. The recording tape cartridge according to claim 1, wherein said inner body of said hub is provided with a plurality of stepped recesses extending in an inwardly radial direction from an outer peripheral edge thereof and said outer ring of said hub is provided with a plurality of engaging members corresponding to said stepped recesses whereby said engaging members and said stepped recesses engage together in face-to-face contact so as to prevent displacement between said inner body and said outer ring in an axial direction and separation therebetween in a radial direction.

6. A hub for use in a recording tape cartridge for winding a recording tape, said hub comprising two separate and distinct integral elements including an inner body having a relatively large thickness in an axial direction and an outer ring thin in said axial direction fitted on an outer cylindrical surface of said inner body, said outer ring having a thickness less than the thickness of said inner body such that said thin outer ring is void of all sink marks and the entire circumferential inner surface of said thin outer ring contacts the entire outer cylindrical surface of said inner body, wherein the recording tape is wrapped around the entire outer cylindrical surface of said outer ring.

7. The hub according to claim 6, wherein said inner body of said hub is made of a plastic resin having a color different from a color of a plastic resin of said outer ring.

8. The hub according to claim 6, wherein said hub further comprises a recessed portion for engagement with a clamping member for clamping an end portion of said record tape, and an injection gate formed on a bottom portion of said recessed portion.

9. The hub according to claim 6, wherein the thickness of said outer ring is in a range of from 0.1 mm to 5 mm.

10. The hub according to claim 6, wherein said inner body is provided with a plurality of stepped recesses extending inwardly in a radial direction from an outer peripheral edge thereof and said outer ring is provided with a plurality of engaging members corresponding to said stepped recesses whereby said engaging members and said stepped recesses engage together in face-to-face contact so as to prevent displacement between said inner body and said outer ring in an axial direction and separation therebetween in a radial direction.

* * * * *